(12) United States Patent
Bostrom (10) Patent No.: US 9,354,101 B2
(45) Date of Patent: May 31, 2016

(54) DEVICE FOR PROVIDING A GAS COMPOSITION AND TEMPERATURE COMPENSATED ACOUSTIC MEASUREMENT OF A LIQUID LEVEL

(71) Applicant: Axsensor AB, Göteborg (SE)

(72) Inventor: Jan Bostrom, Gothenburg (SE)

(73) Assignee: Axsensor AB, Göteborg (SE)

( * ) Notice: Subject to any disclaimer, the term of this patent is extended or adjusted under 35 U.S.C. 154(b) by 233 days.

(21) Appl. No.: 13/939,374

(22) Filed: Jul. 11, 2013

(65) Prior Publication Data

US 2015/0013452 A1 Jan. 15, 2015

(51) Int. Cl.
*G01F 23/00* (2006.01)
*G01F 23/296* (2006.01)

(52) U.S. Cl.
CPC .......... *G01F 23/296* (2013.01); *G01F 23/2962* (2013.01); *G01F 23/2966* (2013.01)

(58) Field of Classification Search
None
See application file for complete search history.

(56) References Cited

U.S. PATENT DOCUMENTS

| 5,471,872 | A | 12/1995 | Cummings | |
| 5,697,248 | A * | 12/1997 | Brown | G01F 23/28 73/290 V |
| 6,386,018 | B1 * | 5/2002 | Letton | G01F 1/662 73/61.79 |
| 2004/0182149 | A1 * | 9/2004 | Balin et al. | 73/290 V |
| 2015/0013452 | A1 * | 1/2015 | Bostrom | 73/290 V |

FOREIGN PATENT DOCUMENTS

| WO | WO-2005038415 | 4/2005 |
| WO | WO-2008008019 | 1/2008 |
| WO | WO-2009020424 | 2/2009 |

\* cited by examiner

*Primary Examiner* — Andre Allen
(74) *Attorney, Agent, or Firm* — Harness, Dickey & Pierce, P.L.C.

(57) ABSTRACT

The present device provides for a gas composition and temperature compensated acoustic measurement of the level of a liquid in a tank. The device comprises a transmitter, a receiver, a processing circuitry, a waveguide for guiding acoustic signals from the transmitter to the liquid level surface and for guiding reflections of the acoustic signals back to the receiver. The waveguide comprises a first end connected to the transmitter, a second end adapted to extend into the liquid, at least one inlet for introducing gas originating from the liquid in the tank into the waveguide, and an outlet for discharging gas out from the waveguide into the tank. The outlet is arranged closer to the first end than at least one of said at least one inlet.

18 Claims, 5 Drawing Sheets

DEVICE FOR PROVIDING A GAS COMPOSITION AND TEMPERATURE COMPENSATED ACOUSTIC MEASUREMENT OF A LIQUID LEVEL

FIELD

The present disclosure relates to a device and a method for providing a compensated measurement of the level of a liquid in a tank.

BACKGROUND

This section provides background information related to the present disclosure which is not necessarily prior art.

An example of a device for providing a compensated measurement of the level of a liquid in a tank is disclosed in the international patent application publication no. WO 2005/038415. The device in WO 2005/038415 comprises a transducer for transmitting and receiving acoustic signals, and a waveguide connected to the transducer and extending into the liquid. The liquid level is basically determined based on the speed of sound and the transit time of the acoustic signal from the transducer to a surface of the liquid (where it is reflected) and back to the transducer again. Since the speed of sound depends on gas composition and temperature which may vary from time to time, the current speed of sound is used in determining the liquid level, which current speed of sound in turn is determined by means of a reference system in the waveguide. Further, since the gas composition and temperature in the reference system may differ from the gas composition and temperature in the rest of the waveguide above the liquid, for instance if the liquid level is low, a fuel pump associated with the tank is used to feed a flow of fluid (namely fuel) originating from the tank into a portion of the waveguide which in use is located above the liquid. The flow of fuel levels the temperature and gas composition, and consequently the speed of sound, throughout the waveguide above the liquid, which in turn allows for a more accurate measurement of the liquid level.

However, the device in WO 2005/038415 relies on the fuel pump to provide the flow of fluid, which may require extensive and costly modifications of the fuel pump and the associated tank when installing the measurement device.

An example of a device for providing a less extensive and less expensive compensated measurement of the level of a liquid in a tank is disclosed in the international patent application publication no. WO 2009/020424.

Compared to the device in WO 2005/038415, the device in WO 2009/020424 e.g. comprises collecting means having a liquid catching surface or opening for collecting free-moving portions of liquid, and directing means having an opening into the waveguide for directing fluid originating from liquid collected by the collecting means into or along a portion of the waveguide which during operation is located above the liquid level. The liquid catching surface or opening is larger than the opening of the directing means.

It has been seen that known devices may adapt slowly to changes in composition of gas and/or temperature leading to a non-optimal levelling out effect of the speed of sound. The delay in levelling effect of the speed of sound implies an undesirable inaccuracy in the acoustic measurements by the devices.

Thus, there is still a need in the art to provide a device for providing a compensated acoustic measurement of the level of a liquid in a tank which allows for more accurate acoustic measurements.

SUMMARY

This section provides a general summary of the disclosure, and is not a comprehensive disclosure of its full scope or all of its features.

According to a first aspect of the invention, it is provided a device for providing a gas composition and temperature compensated acoustic measurement of the level of a liquid in a tank. The device comprises a transmitter adapted to transmit acoustic signals, a receiver adapted to receive reflections of the acoustic signals, a processing circuitry connected to the transmitter and the receiver and adapted to determine the level of the liquid based on the transmitted acoustic signals and the received reflections of the acoustic signals, and a waveguide for guiding acoustic signals from the transmitter to the liquid level surface and for guiding reflections of the acoustic signals back to the receiver. The waveguide comprises a first end connected to the transmitter, a second end adapted to extend into the liquid, at least one inlet for introducing gas originating from the liquid in the tank into the waveguide, and an outlet for discharging gas out from the waveguide into the tank. The outlet is arranged closer to the first end than at least one of the at least one inlet.

The present arrangement of the outlet relative to at least one of the at least one inlet allows for quicker and more efficient leveling of gas composition and temperature throughout the waveguide. The more efficient leveling is at least partly due to that the arrangement allows the device to quicker adapt to changes in either gas composition or temperature.

The speed of sound varies drastically with variations in temperature as well as in gas composition, thus by enabling the device to easier and quicker level the composition of gas and/or the temperature and thereby the speed of sound throughout the waveguide above the liquid level, the device according to the present invention may provide more accurate acoustic measurements of the level of a liquid in a tank.

The device according to the present invention has shown surprisingly good results with regard to increased accuracy of the gas composition and temperature compensated acoustic measurements of a liquid level in a tank.

In one embodiment, the transmitter and the receiver are integrated into a single acoustic transducer.

In one embodiment, the receiver is located between the first end and the second end, above the liquid level during operation, and is able to detect acoustic signals, thereby providing a reference detection allowing the processing circuitry to determine a reference speed of sound in a reference portion extending between the first end and the receiver. The outlet and at least one of the at least one inlet may be arranged in the reference portion.

In one embodiment, the device further comprise a reference element being located between the first end and the second end, above the liquid level during operation, and being able to reflect acoustic signals, thereby providing a reference reflection allowing said processing circuitry to determine a reference speed of sound in a reference portion extending between the first end and the reference element. The outlet and at least one of the at least one inlet are arranged in the reference portion. Typically, the device comprises a reference element when the transmitter and the receiver are comprised in a transducer.

In the presence of a reference portion, the levelling of the speed of sound allows for further more accurate measurements of the liquid level since the speed of sound in the portion of the waveguide between the reference portion and the liquid surface becomes substantially the same as the reference speed of sound calculated with the reference measurement.

In an embodiment, the reference portion further comprises a bottom surface intended to face the liquid level surface during operation, and a top surface intended to face away from the liquid level surface during operation. The at least one inlet is arranged at the bottom surface and the outlet is arranged at the top surface. Such an arrangement may advantageously use passive transport of fluid into the device, such as by capillary attraction.

In an embodiment, the reference portion is arranged in a plane which is horizontal during operation. At least the reference portion is arranged in a plane which is horizontal upon installation of the device in e.g. a tank. Such an arrangement may be advantageously space-saving. An arrangement having a reference portion in a single plane allows for a reliable reference speed of sound.

In an embodiment, the device may further comprise a retaining chamber for at least temporarily retaining liquid arranged such that at least one inlet forms a fluid connection between the retaining chamber and the waveguide during operation. If a reference portion is present, at least one of said at least one inlet typically forms a fluid connection between the retaining chamber and the reference portion during operation.

In an embodiment, the fluid connection is formed by means of capillary attraction. Capillary attraction, also called capillary action, occurs when there are favorable interactions between molecules of a liquid and a surface, e.g. a thin tube or an absorbing element. Capillary attraction are forces of adhesion, i.e. forces that bind a substance to a surface, as distinct from forces of cohesion, i.e. forces that bind molecules of the substance together. Capillary attraction allows transportation of non-flowing liquid, and "upwards" transportation of liquid, increasing the design options of the measurement device.

Further, an arrangement working by capillary attraction is not dependent on active means for supplying fluid throughout the waveguide for levelling the gas composition and the temperature. However, also active means for supplying fluid to the waveguide, such as a pump, may be added to a device according to an embodiment of the present invention.

In an embodiment, comprises an absorbing element has a portion adapted to collect liquid originating from the liquid in the tank and to release gas originating from said liquid is arranged in the retaining chamber.

Typically, the absorbing element is arranged close to, such as in direct contact with, at least one of the at least one inlet.

Since an absorbing element may hold liquid, it allows for passive transport during a relatively long period of time. Passive transport of gas originating from the liquid in the tank into the waveguide, e.g. the reference portion, via the at least one inlet during a relatively long period of time allows for continuous adaptation of the device to the changes in gas composition and in temperature occurring throughout the waveguide.

A device according to an embodiment of the present invention which comprises an absorbing element allows for a self-regulating system as the absorbing element may collect liquid when getting dry, may release gas when the temperature increases and may retain liquid between these two states.

The absorbing element is easy to fit into the retaining chamber, since an absorbing element is easy to form into a desirable shape, such as by cutting.

In an embodiment, the absorbing element is adapted to extend into the liquid in the tank and to collect said liquid by means of capillary attraction. Such an arrangement allows for passive transport of liquid from the tank into the retaining chamber.

In an embodiment, the absorbing element is adapted to extend into an open container comprising the liquid. The open container is arranged inside the tank and has a (horizontal) cross-sectional area being smaller than the cross-sectional area of the tank.

The arrangement of an open container inside the tank may be advantageous when the level of liquid in the tank is very low, but gas originating from the liquid in the tank is still needed in order to successfully level out the gas composition and the temperature throughout waveguide above the liquid level surface in order to obtain accurate acoustic measurements. The open container also allows for a shorter distance over which the capillary action has to work.

In an embodiment, the device comprises an absorbing element arranged to at least partly enclose the protruding portion of the waveguide. For instance the portion of the absorbing element adapted to extend into the liquid may be arranged such as to enclose the protruding portion of the waveguide also adapted to extend into the liquid. Such an arrangement may allow for a more constant temperature throughout the entire waveguide during operation due to a more constant mass over the waveguide. The mass of the waveguide may be affected by changes in temperature and by keeping the mass per length of the waveguide more constant the temperature may also vary less over the waveguide.

In an embodiment, the device further comprises a closed channel comprising a first opening and a second opening. The first opening and the second opening are arranged at opposite ends of the closed channel. The closed channel is adapted to guide gas between the first opening and the second opening. The device further comprises a pre-chamber arranged between the first opening and the second opening. The pre-chamber comprises gas originating from the liquid in the tank during operation. The first opening is connected to the outlet such that the closed channel forms a fluid connection between the pre-chamber and the waveguide during operation.

The closed channel may for instance guide gas from the waveguide, e.g. the reference portion, to the atmosphere of the tank or back into the liquid in the tank.

The pre-chamber is beneficial when the closed channel is subjected to an undertow, since fluid, such as saturated gas, originating from the liquid in the tank may be comprised in the pre-chamber, thereby preventing drastic changes in gas composition and temperature inside the waveguide due to e.g. undertow.

In an embodiment, the second opening, an opening for the absorbing element into the retaining chamber and the second end of the waveguide are adapted to be arranged below the liquid level surface during operation. Such an arrangement is beneficial for allowing the device to function as a diving bell upon drastic changes in liquid level inside the tank. Drastic changes in liquid level inside the tank may be due to irregularities in the environment in which the vehicle comprising the tank is travelling.

In an example, the pre-chamber also comprises an absorbing element at least adapted to hold liquid originating from the liquid in the tank and to release gas originating from said liquid. The absorbing element may be the same piece of absorbing material as arranged in the retaining chamber.

In an example, the pre-chamber is connected to the absorbing element arranged in the retaining chamber via an opening serving as a fluid connection between the pre-chamber and the absorbing element.

In an embodiment, the closed channel further comprises an intermediate chamber arranged between the first opening and the second opening, wherein said intermediate chamber has a larger cross-sectional area than the cross-sectional area of the first opening and the cross-sectional area of the second opening, respectively. Typically, the intermediate chamber is arranged between the first opening of the closed channel and the pre-chamber.

An intermediate chamber is beneficial when the liquid level or temperature decreases in the waveguide, as it allows atmosphere from the tank to be drawn in through the second opening of the closed channel and firstly gets mixed with the content of the pre-chamber and secondly gets further mixed with the saturated gas present in the intermediate chamber.

Typically, the intermediate chamber and the pre-chamber are connected via a portion of the closed channel in the shape of a pipe or a tube, or alternatively, in the shape of an opening.

In an embodiment, a portion of the waveguide is formed by a housing comprising at least a first part arranged to face the liquid level surface in the tank during operation, a second part, and a third part. The second part is arranged in between the first part and the third part. The first part and the second part form the retaining chamber, and the second part and the third part form the portion of the waveguide.

The housing may further comprise a fourth part arranged such that the third part and the fourth part form a pre-chamber and an intermediate chamber. The second part and the third part are arranged in between the first part and the fourth part.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The device according to the present invention is suitable for providing a gas composition and temperature compensated acoustic measurement of the level of a liquid in a tank. When fluid originating from the liquid (especially gasoline or petrol in case the tank is a fuel tank) in the tank evaporates into the waveguide of the device, it is important to level out the differences in gas composition and temperature as quick as possible in order to not disturb the acoustic measurements of the liquid level in the tank.

In a device according to the present invention, the outlet is arranged closer to the first end than at least one of the at least one inlet in a way such that acoustic signals are allowed to travel in the waveguide. Further, the at least one inlet is arranged such as to allow gas to be introduced into the waveguide, e.g. into a reference portion, and the outlet is arranged such as to allow gas to be discharged out from the waveguide, e.g. out from the reference portion.

The at least one inlet and the outlet are preferably small in cross-sectional dimension compared to the cross-sectional dimension of the waveguide, since it thereby does not influence the acoustic signals and reflections of acoustic signals travelling throughout the waveguide.

The device may also comprise more than one outlet, e.g. in the shape of holes, a perforation or a piece of a breathing material. The one or more outlet(s) is adapted to allow gas to pass both into and out from the waveguide. The direction of the gas flow through the outlet depends on the liquid level in the waveguide.

The positioning and dimensioning of the at least one inlet and the outlet in the device according to embodiments of the present invention allows for more efficient levelling of the gas composition and the temperature throughout the waveguide during operation, thereby enhancing the levelling of the speed of sound during operation.

Figure 1:
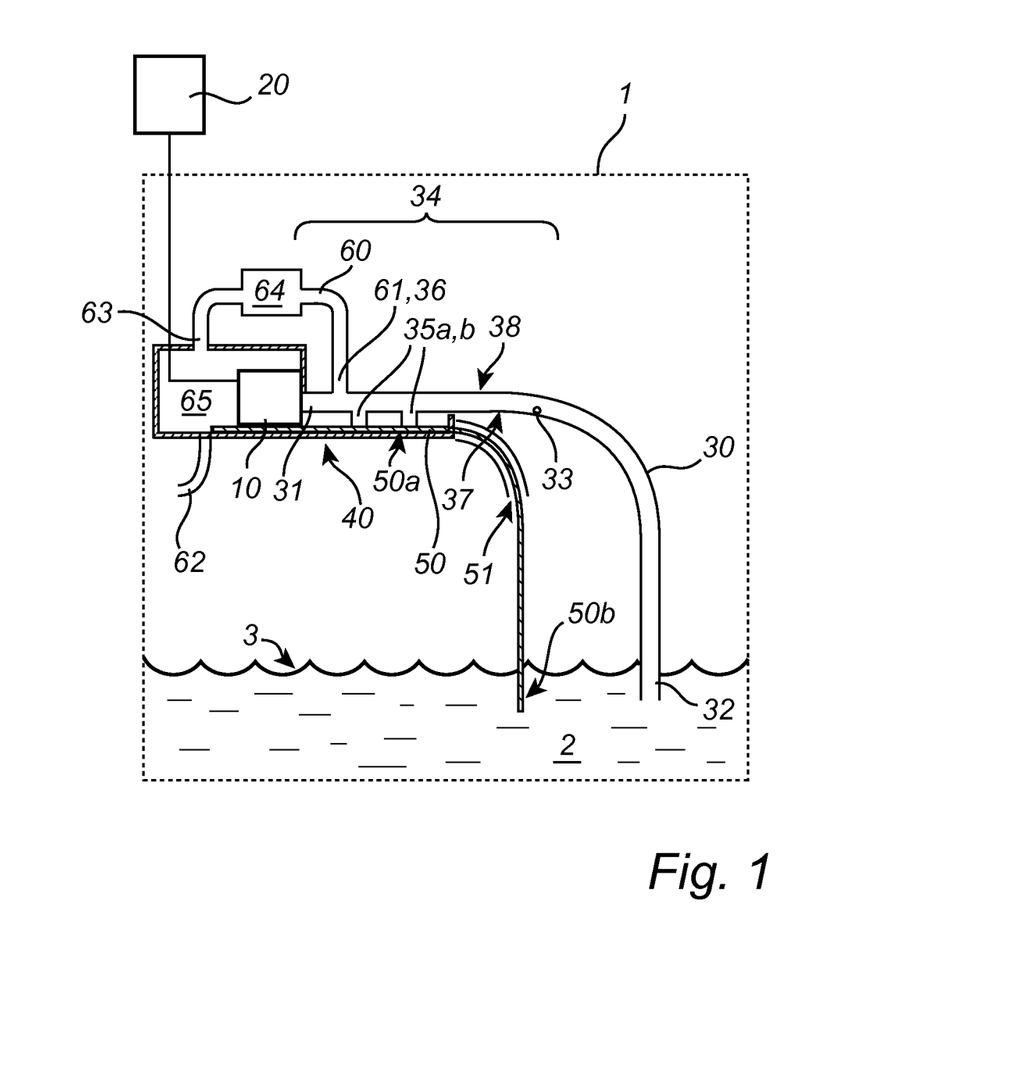
FIG. 1 schematically shows an at least partly cross-sectional side view of a device according to a first embodiment of the invention.

FIG. 1 illustrates a liquid level measurement device arranged in a tank 1 according to a first embodiment of the present invention. The liquid level measurement device is a device for providing a gas composition and temperature compensated acoustic measurement of the liquid in the tank. The tank 1 may for instance be a fuel tank for a vehicle, such as a car, a truck or a boat.

The device comprises a transducer 10, a processing circuitry 20, a waveguide 30, a retaining chamber 40 and an absorbing element 50.

The transducer 10 is adapted to transmit acoustic signals and to receive reflections of the acoustic signals. The transducer 10 may be an electro-acoustic transducer generally adapted to convert electrical signals to acoustic signals or sound pulses, and vice versa. For example, the frequency may be a frequency allowing for plane wave propagation. Plane wave propagation is typically dependent on both the frequency and the diameter of the waveguide. The transducer 10 may for instance comprise a double-acting piezoelectric component. The transducer 10 may comprise a separate sound transmitter and sound receiver.

In FIG. 1, the transducer 10 is placed inside the tank 1, more particularly, in the upper part of the tank above the liquid level surface 3. Alternatively, the transducer 10 may be placed outside the tank 1.

The processing circuitry 20 is connected to the transducer 10 for supplying electrical signals thereto and to evaluate electrical signals therefrom. The processing circuitry 20 is adapted to determine the level of the liquid based on the transmitted acoustic signals and the received reflections of the acoustic signals.

In FIG. 1, the processing circuitry 20 is arranged outside the tank 1. Alternatively, the processing circuit 20 may be arranged inside the tank, optionally, integrated with the transducer 10.

The waveguide 30 is generally adapted to guide acoustic signals from the transducer 10 to the liquid level surface 3 and for guiding reflections of the acoustic signals back to the transducer. The waveguide may for instance be a tube or a pipe in which acoustic signals can be guided.

The waveguide comprises a first end 31 and a second end 32. The first end 31 is connected to the transducer 10 to guide the acoustic signals to and from the transducer 10. The second end 32 is adapted to be extended or submersed into the liquid 2 in the tank 1, such that the acoustic signals may be reflected by the liquid level surface 3 during operation.

The waveguide further comprises a reference element 33 being located between the first end and the second end. The reference element 33 is preferably arranged at a known distance from the transducer 10 above a predetermined point in the waveguide 30 up to which liquid generally is allowed to reach. Thus, the reference element 33 is generally located above the liquid level surface 3 during operation.

The reference element 33 is able to reflect acoustic signals, thereby providing a reference reflection allowing the processing circuitry 20 to determine a reference speed of sound in a reference portion 34 extending between the first end 31 and the reference element 33.

The reference element 33 may for instance be a small protrusion, such as a pin or a tap or a ring, adapted to partly reflect an acoustic signal travelling in the waveguide 30 in the direction from the first end 31 towards the second end 32. Alternatively, the reference element 33 may be a change in cross-sectional area, e.g. of the waveguide.

The waveguide may further comprise a second reference element (not shown in FIG. 1) similar to the first reference element 33, thereby providing a second reference reflection allowing said processing circuitry 20 to determine a second reference speed of sound in a second reference portion extending between said first end 31 and said second reference element. The second reference element being located between the reference element 33 and the second end 32.

The device may comprise additional reference elements, which may be used in analogy with the first reference element 33 and the second reference element, respectively.

The reference portion 34, extending between the first end 31 and the reference element 33, comprises at least one inlet, herein two inlets 35a, 35b are shown, for introducing gas originating from the liquid in the tank into the reference portion, and an outlet 36 for discharging gas out from the reference portion into the tank. The outlet 36 is arranged closer to the first end 31 than at least one of the inlets 35a, 35b. The outlet may comprise a valve (not shown).

In FIG. 1, the reference portion 34 comprises a bottom surface 37 intended to face the liquid level surface 3 during operation, and a top surface 38 intended to face away from the liquid level surface 3 during operation. The inlets 35a, 35b are arranged at the bottom surface 37 and the outlet 36 is arranged at the top surface 38. Alternatively, the inlets and the outlet may be arranged on a sidewall (not shown) of the reference portion.

At least a part of the reference portion 34 may have a helical or flat spiral shape (not shown in FIG. 1) in order to save space, as shown in the international patent application publication no. WO 2009/020424. At least a part of the reference portion 34 may be placed outside the tank 1 (not shown).

The reference portion is typically arranged in the waveguide for guiding acoustic signals from the transmitter to the liquid level surface and for guiding reflections of the acoustic signals back to the receiver. However, the reference portion may alternatively be arranged in a separate waveguide used as an external reference system.

As shown in FIG. 1, the device comprises a retaining chamber 40 for at least temporarily retaining liquid in the device during operation. The liquid is preferably retained close to the inlets 35a, 35b, such that at least one of the at least one inlet may serve as a fluid connection between the retaining chamber 40 and the reference portion 34 during operation. The fluid connection may be formed by means of capillary attraction. During operation, the retained liquid may slowly evaporate and in an efficient way level the gas composition in the device where the acoustic signal travels, with a more accurate measurement of the liquid level as a result.

In FIG. 1, two inlets are present 35a, 35b, and the retaining chamber 40 is arranged such as to allow a fluid connection to be formed by each of the two inlets. Alternatively, the retaining chamber 40 may be arranged such as only one of the at least one inlet 35a, 35b form a fluid connection between the retaining chamber 40 and the reference portion 34.

As shown in FIG. 1, the absorbing element 50 has a portion 50a arranged inside the retaining chamber 40. The absorbing element 50 may be a piece of liquid absorbing material such as a spongy material, a porous material, a felt, or the like. The absorbing element 50 is adapted to collect liquid originating from the liquid in the tank and to release gas originating from said liquid. The absorbing element 50 further has a portion 50b adapted to extend into the liquid 2 in the tank 1. The absorbing element may collect liquid originating from the liquid in the tank and transport gas originating from the liquid into the waveguide 30, in particular into the reference portion 34, by means of capillary attraction. The absorbing element 50 passes through the opening 51 in the retaining chamber 40.

Alternatively, the retaining chamber may comprise at least one tube (not shown) which is adapted to extend in to the liquid in the tank. The at least one tube may be narrow enough to collect liquid originating from the liquid in the tank and transport gas originating from the liquid into the waveguide by means of capillary attraction.

The liquid collected e.g. by the absorbing element or by the at least one tube may optionally be pre-collected in an open container (not shown) arranged e.g. at the bottom of the tank. Typically, the open container has a smaller diameter than the tank. The open container may, for instance, be a container comprising a fuel pump. The open container comprising the fuel pump typically has a height within the range of from 5 cm to 15 cm. The open container is typically continuously filled with fuel, such as actively by the fuel pump or passively by an additional absorbing element being at least partly arranged in the open container. For instance, the additional absorbing element may be arranged with a first end portion inside the open container arranged in a first half of a saddle tank and with a second end in a second half of the saddle tank, wherein the second half of the saddle tank typically comprises more liquid than the first half of the saddle tank. If the second half of the saddle tank comprises an additional open container comprising a pump, the second end of the absorbing material may be arranged in the additional open container.

An arrangement including such an open container may be advantageous when the level of liquid is very low in the tank, but gas originating from the liquid in the tank is still needed in order to successfully level out the gas composition and the temperature throughout waveguide above the liquid level surface in order to obtain accurate acoustic measurements.

As illustrated, the device in FIG. 1 may further comprise a closed channel 60, an intermediate chamber 64 and a pre-chamber 65.

The closed channel 60 comprises a first opening 61 and a second opening 62. The first opening and the second opening are arranged at opposite ends of the closed channel. The second opening 62 is typically arranged at the same height as the opening 51 for the absorbing element.

The first opening 61 corresponds to the outlet 36 such that the outlet forms a fluid connection between the closed channel 60 and the reference portion 34 during operation.

The closed channel 60 is adapted to guide gas between the first opening 61 and the second opening 62. Depending on the gas composition and the temperature in the waveguide 30 relative to the environment outside the device, the closed channel may either guide gas away from the waveguide or guide gas towards the waveguide. In the former case, gas is guided from the first opening 61 towards the second opening 62. In the latter case, gas is guided from the second opening 62 towards the first opening 61.

The pre-chamber 65 is arranged between the first opening 61 and the second opening 62. During operation, the pre-chamber 65 typically comprises gas originating from the liquid in the tank.

As shown in FIG. 1, the pre-chamber 65 may be connected to the retaining chamber 40. Further, the pre-chamber 65 may comprise an opening 41a, 41b (shown in FIG. 5) arranged to form a fluid connection between the retaining chamber 40 and the pre-chamber 65 during operation. This opening 41a, 41b typically has a larger cross-sectional area than the at least one inlet 35a, 35b.

The closed channel 60 may further comprise a portion having a larger cross-sectional area than the other portions of the closed channel (the pre-chamber 65 excluded). This portion forms the intermediate chamber 64, which is adapted to retain fluid inside the closed channel during operation.

The intermediate chamber 64 is arranged between the first opening 61 and the second opening 62, typically between the first opening 61 and the pre-chamber 65.

The intermediate chamber 64 has a larger cross-sectional area than the cross-sectional area of the first opening 61 and the cross-sectional area of the second opening 62, respectively.

The portion 63 of the closed channel 60 being arranged between the intermediate chamber 64 and the pre-chamber 65 is in some embodiments an opening in the sidewall 67 (shown in FIGS. 4-5) between the intermediate chamber 64 and the pre-chamber 65.

An exemplary operation of the measurement device shown in FIG. 1 will now be described.

Firstly, an electrical signal or pulse is provided by the processing circuitry 20 to the transducer 10 causing the transducer to transmit a corresponding acoustic signal or sound pulse. The transmitted acoustic signal is guided by the waveguide 30 along a reference portion 34 towards the liquid level surface 3. A fraction of the acoustic signals is reflected back towards the transducer 10 by the reference element 33 via the reference portion 34 of the waveguide 30. Another fraction of the acoustic signals is reflected back towards the transducer 10 by the liquid level surface 3 via the waveguide 30. In response to the two reflected fractions of acoustic signals, the transducer 10 generates corresponding electric signals to be processed by the processing circuitry 20.

The processing circuitry 20 firstly uses the transit time for the fraction of acoustic signals reflected by the reference element 33 together with the known distance between the transducer 10 and the reference element 33 to calculate a reference speed of sound. The processing circuitry 20 then calculates the level of liquid 2 in the tank 1 based on the reference speed of sound and the transit time for the fraction of signals reflected by the liquid level surface 3.

Also a second reference speed may be calculated and used in the level measurement.

Figure 2:
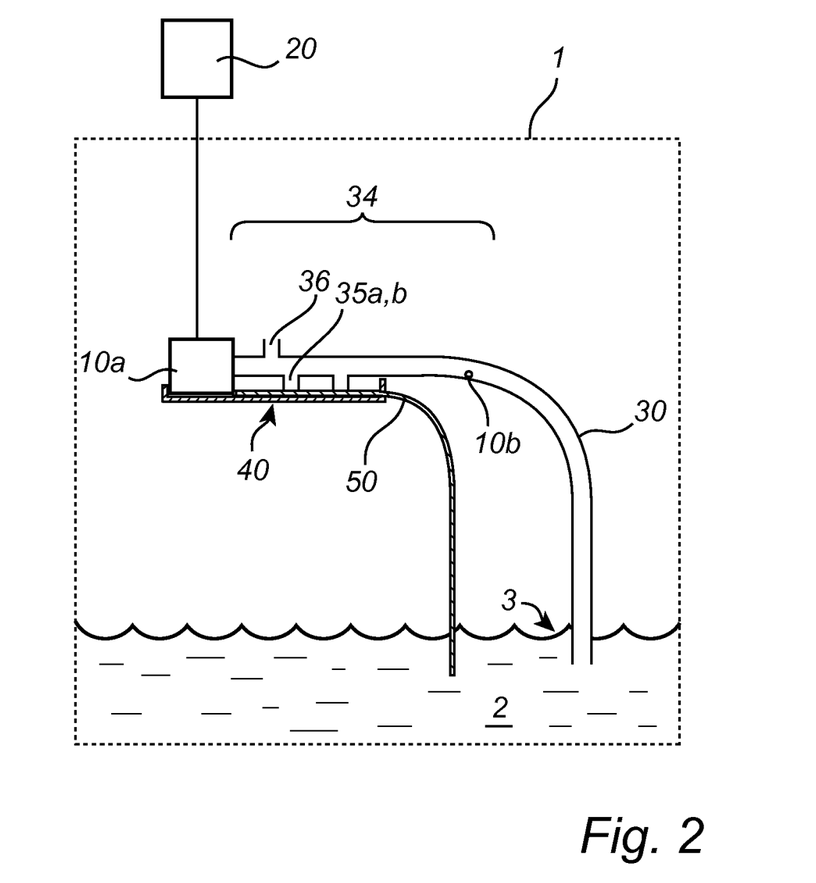
FIG. 2 schematically shows an at least partly cross-sectional side view of a device according to a second embodiment of the invention.

In FIG. 2, a device according to a second embodiment is shown. Similarly to the device in FIG. 1, this device comprises a processing circuitry 20, a waveguide 30 comprising two inlets 35a, 35b and an outlet 36, a retaining chamber 40 and an absorbing element 50. However, instead of a transducer 10, the device in FIG. 2 comprises a separate transmitter 10a and a separate receiver 10b.

A reference portion 34 is extending from the transmitter 10a to the receiver 10b, instead of from the transducer 10 to the reference element 33 as in FIG. 1. The different kinds of reference portions serve the same purpose, however using slightly different techniques.

The transmitter 10a is adapted to transmit acoustic signals. During operation, transmitted acoustic signals are guided by the waveguide towards the liquid level surface of the tank.

The receiver 10b is adapted to detect acoustic signals. Typically, the waveguide comprises an opening which connects the receiver 10b to the waveguide. Optionally, a closed channel is arranged between the opening and the receiver 10b. Alternatively, the receiver 10b may be arranged inside the waveguide. Thus, the receiver 10b may detect both acoustic signals transmitted from the transmitter 10a, and acoustic signals reflected by the liquid level surface 3 in the tank 1.

Both the transmitter 10a and the receiver 10b are connected to the processing circuitry 20.

An exemplary operation of a measurement device shown in FIG. 2 will now be described.

Firstly, an electrical signal or pulse is provided by the processing circuitry 20 to the transmitter 10a causing the transmitter to transmit a corresponding acoustic signal. The transmitted acoustic signal is guided by the waveguide 30 towards the liquid level surface 3. The acoustic signals are detected by the receiver 10b arranged in the waveguide 30. The acoustic signals are also reflected back towards the receiver 10b by the liquid level surface 3 via the waveguide 30, and thus also the reflected acoustic signals are detected. In response to the two detections of acoustic signals, the receiver 10 generates corresponding electric signals to be processed by the processing circuitry 20.

The processing circuitry 20 firstly uses the transit time for the acoustic signals detected by the receiver 10b without being reflected together with the known distance between the transmitter 10a and the receiver 10b to calculate a reference speed of sound. The processing circuitry 20 then calculates the level of liquid 2 in the tank 1 based on the reference speed of sound and the transit time for the acoustic signals when they have been reflected by the liquid level surface 3.

Figure 3:
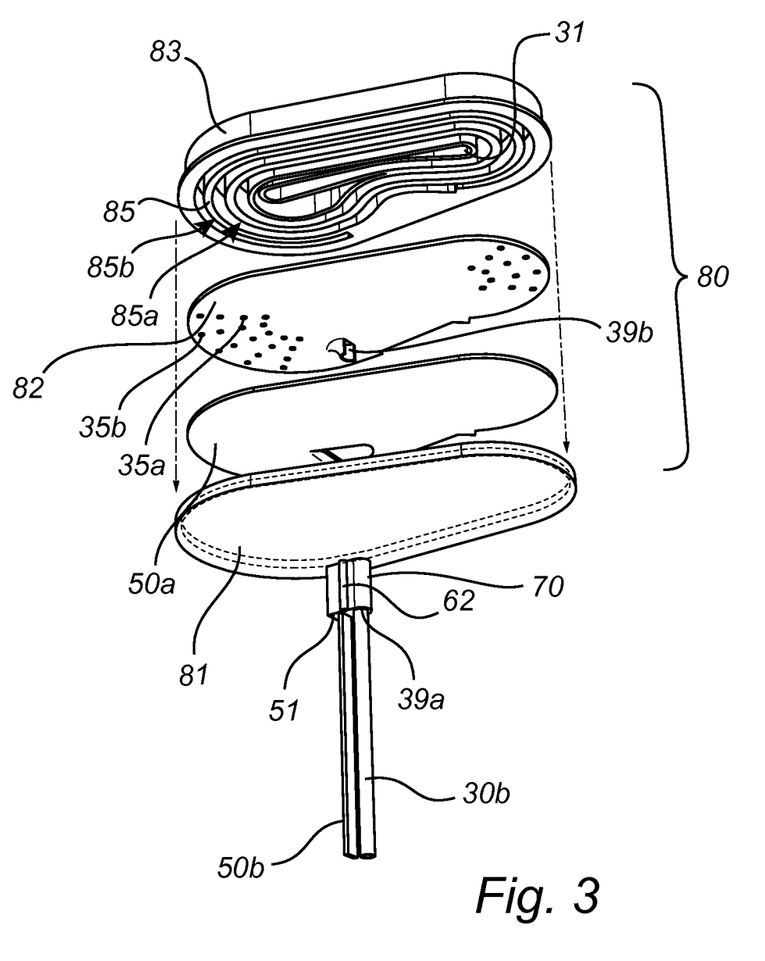
FIG. 3 shows an exploded view of a device according to a third embodiment of the invention.
Figure 4:
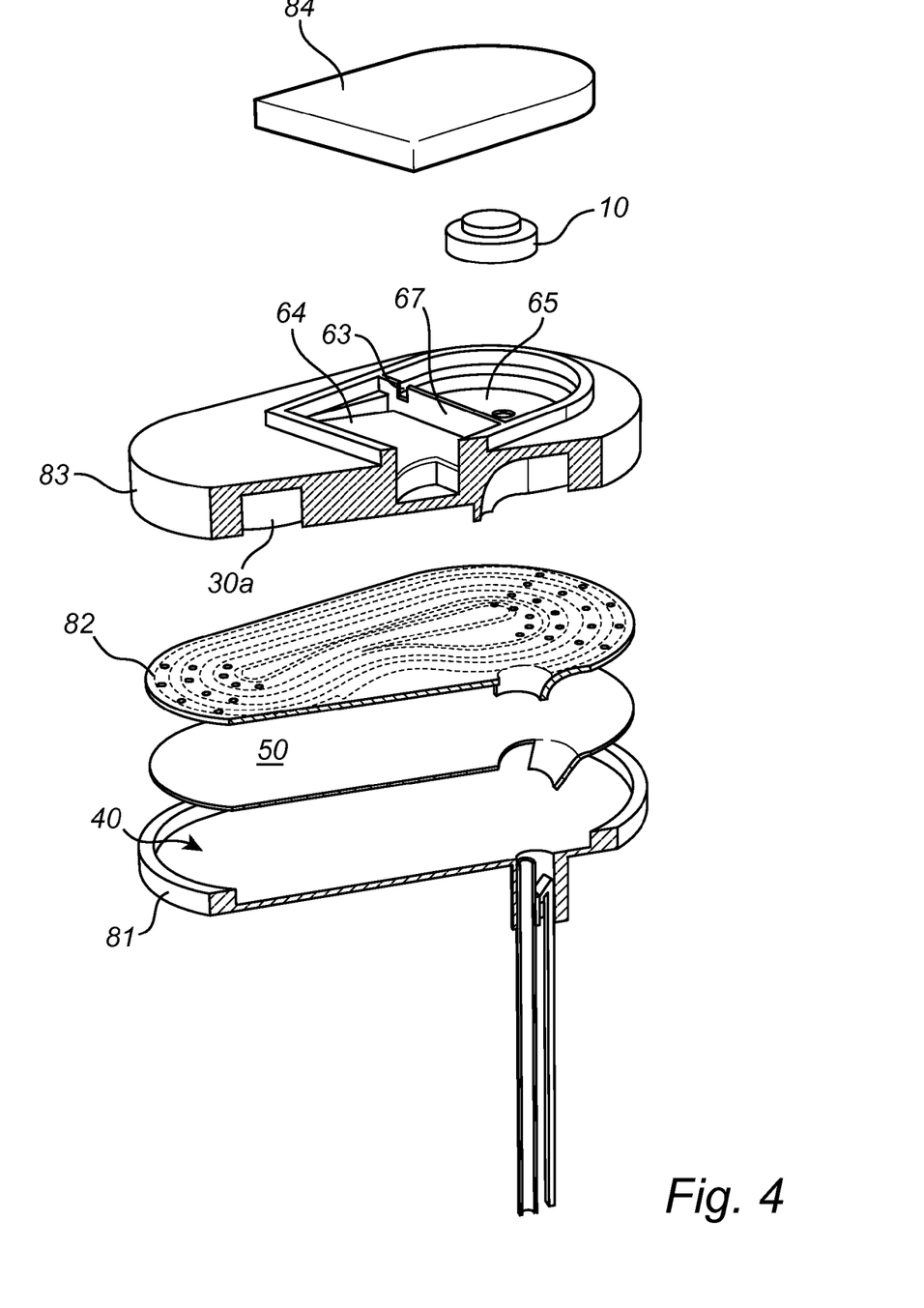
FIG. 4 shows an exploded view from a different angle of the device in FIG. 3.

FIGS. 3-4 show in more detail a specific design of the device in FIG. 1. The device here comprises a main sensor body including a housing 80 which forms a portion 30a of the waveguide. The remaining portion 30b of the waveguide 30, intended to extend into the liquid in the tank, is formed by a tubular member connected to the housing 80.

As shown in FIGS. 3-4, the housing 80 comprises a first dish-shaped part 81 arranged closest to the liquid level surface during operation. The part 81 has an opening 39a for introducing the tubular member into the housing. The first dish-shaped part 81 forms the bottom of the retaining chamber 40. A piece of an absorbing material is arranged in the first dish-shaped part 81 to form the absorbing element 50. A first portion 50a of the absorbing element 50 is arranged inside the retaining chamber 40, and another portion 50b of the absorbing element 50 extends through an opening 51 in the dish-shaped part 81 and into the liquid during operation.

The first dish-shaped part 81 further comprises an opening forming the second opening 62 mentioned above with reference to FIG. 1. Typically, the openings 39a, 62 and 51 are arranged relatively close to each other, such as in a projection 70 of the dish-shaped part as shown in FIG. 3. An arrangement of the openings 39a, 62 and 51 close to each other, and also preferably in a plane being substantially horizontal upon installation of the device, is advantageous for the tolerance to tilting of the device during operation. Such an arrangement may allow the device to function as a diving bell when the second opening 62, the opening for the absorbing element 51 and the second end 32 of the waveguide all are arranged below the liquid level surface.

The second opening 62 and the opening for the absorbing element 51 may be a single opening (not shown) constituting the opening to both the closed channel 60 and the retaining chamber 40.

On top of the absorbing element 50 is arranged a second essentially flat part 82 forming the bottom surface of the waveguide portion 30a. The part 82 comprises inlets 35a, 35b from the retaining chamber 40 to the waveguide portion 30a.

The part 82 also comprises an opening 39b connecting to the opening 39a in the first part to form a continuous opening. The continuous opening may have substantially the same cross-sectional area through the first dish-shaped part 81 and the second essentially flat part 82. Alternatively, the continuous opening may have a varying cross-sectional area over the first part 81 and the second part 82, thereby forming a reference element in the waveguide.

A third patterned part 83 is arranged on top of the second essentially flat part 82. On the side facing the second essentially flat part 82, the third patterned part 83 has an essentially helical pattern 85 forming the waveguide portion 30a. On the side facing away from the second essentially flat part 82, the third patterned part 83 has two indention's forming the pre-chamber 65 and the intermediate chamber 64, respectively.

The essentially helical pattern 85 is formed by a protruding side wall 85a. The wall 85a runs in the essentially helical pattern from the opening 39b to the pre-chamber 65 in a more central position of the housing.

The third patterned part 83 also comprises an outlet 36 from the waveguide portion 30a to the intermediate chamber 64. The outlet 36 corresponds to the first opening 61 of the closed channel 60.

The third patterned part 83 also comprises a portion of the closed channel 60 in the form of an opening 63 formed in the sidewall 67 between the pre-chamber 65 and the intermediate chamber 64.

A lid 84 (shown in FIG. 4) is arranged to cover the third patterned part 83.

In FIG. 4, a transducer 10 is arranged inside the pre-chamber 65 having a bottom formed by the third patterned part 83 and a top formed by the lid 84. The transducer 10 is arranged in contact with the first end 31 of the waveguide 30. The transducer 10 may in an alternative embodiment be substituted with a transmitter.

Figure 5:
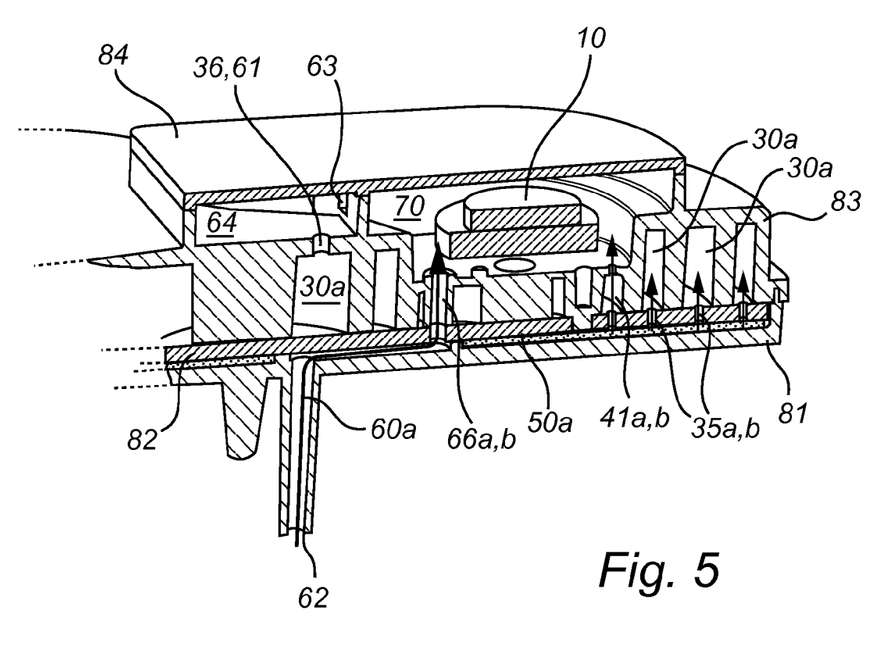
FIG. 5 shows a cross-sectional side view of a part of the device in FIGS. 3-4 in an assembled state.

FIG. 5 illustrates the device in FIGS. 3-4 in an assembled state. Both the second essentially flat part 82 and the third patterned part 83 comprise an opening 66a, 66b arranged to form the opening of a continuous portion 60a of the closed channel 60 arranged between the second opening 62 and the pre-chamber 65 into the pre-chamber 65. The continuous portion 60a is arranged such as not to pass through the waveguide 30. In FIG. 5, it is further shown how the continuous portion 60a is at least partly formed in between the first dish-shaped part 81 and a top formed by the second essentially flat part 82.

Further, both the second essentially flat part 82 and the third patterned part 83 comprise an opening 41a, 41b arranged to form a fluid connection between the retaining chamber 40 and the pre-chamber 65. These openings 41a, 41b typically has a larger cross-sectional area than the inlets 35a, 35b, arranged in the second essentially flat part 82, do have.

In an embodiment, not shown in the figures, two devices may be arranged together. Such an arrangement may for instance be suitable in a saddle tank. Alternatively, the device may only include a common transducer, but two waveguides in a way similar to the device shown in the international patent application publication no. WO 08/008019.

The person skilled in the art realizes that the present invention by no means is limited to the preferred embodiments described above. On the contrary, many modifications and variations are possible within the scope of the appended claims. For example, although acoustic pulses have been used in the described embodiments, the inventive measurement device may also be used with other measurement modes such as standing wave measurement. Also, the above embodiments and variants may be combined in several ways.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A device for providing a gas composition and temperature compensated acoustic measurement of the level of a liquid in a tank, comprising:
    a transmitter adapted to transmit acoustic signals;
    a receiver adapted to receive reflections of said acoustic signals;
    a processing circuitry connected to the transmitter and the receiver and adapted to determine the level of the liquid based on the transmitted acoustic signals and the received reflections of the acoustic signals;
    a waveguide for guiding acoustic signals from the transmitter to the liquid level surface and for guiding reflections of the acoustic signals back to the receiver, the waveguide comprising
        a first end connected to the transmitter,
        a second end adapted to extend into the liquid,
        at least one inlet for introducing gas originating from the liquid in the tank into the waveguide, and
        an outlet for discharging gas out from the waveguide into the tank;
    wherein said outlet is arranged closer to the first end than at least one of said at least one inlet; and
    a retaining chamber for at least temporarily retaining liquid arranged such that at least one of said at least one inlet forms a fluid connection between the retaining chamber and the waveguide during operation,
    wherein an absorbing element adapted to collect liquid originating from the liquid in the tank and to release gas originating from said liquid is arranged in the retaining chamber.

2. The device according to claim 1, wherein said transmitter and said receiver are integrated into a single acoustic transducer.

3. The device according to claim 1, wherein said receiver is located between the first end and the second end, above the liquid level during operation, and is able to detect acoustic signals, thereby providing a reference detection allowing said processing circuitry to determine a reference speed of sound in a reference portion extending between said first end and said receiver, and wherein said outlet and at least one of said at least one inlet are arranged in said reference portion.

4. The device according to claim 1, further comprising a reference element being located between the first end and the second end, above the liquid level during operation, and being able to reflect acoustic signals, thereby providing a reference reflection allowing said processing circuitry to determine a reference speed of sound in a reference portion extending between said first end and said reference element, and wherein said outlet and at least one of said at least one inlet are arranged in said reference portion.

5. The device according to claim 4, wherein the reference portion further comprises a bottom surface intended to face the liquid level surface during operation, and a top surface intended to face away from the liquid level surface during operation, wherein said at least one inlet is arranged at the bottom surface and said outlet is arranged at the top surface.

6. The device according to claim 5, wherein the reference portion is arranged in a plane which is horizontal during operation.

7. The device according to claim 1, wherein the fluid connection is formed by capillary attraction.

8. The device according to claim 1, wherein said absorbing element has a portion adapted to extend into the liquid in the tank and to collect said liquid by capillary attraction.

9. The device according to claim 8, wherein said absorbing element is adapted to extend into an open container comprising liquid, said open container being arranged inside the tank and having a cross-sectional area being smaller than the cross-sectional area of the tank.

10. A device for providing a gas composition and temperature compensated acoustic measurement of the level of a liquid in a tank comprising:
 a transmitter adapted to transmit acoustic signals;
 a receiver adapted to receive reflections of said acoustic signals;
 a processing circuitry connected to the transmitter and the receiver and adapted to determine the level of the liquid based on the transmitted acoustic signals and the received reflections of the acoustic signals;
 a waveguide for guiding acoustic signals from the transmitter to the liquid level surface and for guiding reflections of the acoustic signals back to the receiver, the waveguide comprising
  a first end connected to the transmitter,
  a second end adapted to extend into the liquid,
  at least one inlet for introducing gas originating from the liquid in the tank into the waveguide, and
  an outlet for discharging gas out from the waveguide into the tank;
  wherein said outlet is arranged closer to the first end than at least one of said at least one inlet;
 a closed channel comprising a first opening and a second opening, said first opening and said second opening being arranged at opposite ends of the closed channel, said closed channel being adapted to guide gas between said first opening and said second opening; and
 a pre-chamber arranged between the first opening and the second opening, and comprising gas originating from the liquid in the tank during operation;
 wherein the first opening is connected to said outlet such that said closed channel forms a fluid connection between the pre-chamber and the waveguide during operation.

11. The device according to claim 10, wherein said second opening, an opening for the absorbing element into the retaining chamber and said second end of the waveguide are adapted to be arranged below the liquid level surface during operation.

12. The device according to claim 11, wherein said closed channel further comprises an intermediate chamber arranged between the first opening and the second opening, wherein said intermediate chamber has a larger cross-sectional area than the cross-sectional area of the first opening and the cross-sectional area of the second opening, respectively.

13. The device according to claim 12, wherein the absorbing element is arranged to at least partly enclose a protruding portion of the waveguide.

14. The device according to claim 10, wherein said transmitter and said receiver are integrated into a single acoustic transducer.

15. The device according to claim 10, wherein said receiver is located between the first end and the second end, above the liquid level during operation, and is able to detect acoustic signals, thereby providing a reference detection allowing said processing circuitry to determine a reference speed of sound in a reference portion extending between said first end and said receiver, and wherein said outlet and at least one of said at least one inlet are arranged in said reference portion.

16. The device according to claim 10, further comprising a reference element being located between the first end and the second end, above the liquid level during operation, and being able to reflect acoustic signals, thereby providing a reference reflection allowing said processing circuitry to determine a reference speed of sound in a reference portion extending between said first end and said reference element, and wherein said outlet and at least one of said at least one inlet are arranged in said reference portion.

17. The device according to claim 16, wherein the reference portion further comprises a bottom surface intended to face the liquid level surface during operation, and a top surface intended to face away from the liquid level surface during operation, wherein said at least one inlet is arranged at the bottom surface and said outlet is arranged at the top surface.

18. The device according to claim 17, wherein the reference portion is arranged in a plane which is horizontal during operation.

* * * * *